(12) United States Patent  
Fan et al.

(10) Patent No.: US 7,674,448 B2  
(45) Date of Patent: Mar. 9, 2010

(54) METHOD FOR MANUFACTURING ISOTOPE-DOPED CARBON NANOTUBES

(75) Inventors: Shou-Shan Fan, Beijing (CN); Liang Liu, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1142 days.

(21) Appl. No.: 11/140,196

(22) Filed: May 27, 2005

(65) Prior Publication Data

US 2005/0276742 A1    Dec. 15, 2005

(30) Foreign Application Priority Data

Jun. 9, 2004    (CN) ...................... 2004 1 0027635.7

(51) Int. Cl.  
*D01F 9/12* (2006.01)  
*B01J 19/08* (2006.01)

(52) U.S. Cl. ................. 423/447.1; 423/447.2; 423/460; 423/445 B; 977/844; 422/186

(58) Field of Classification Search ............. 423/447.1, 423/445 B, 447.2, 447.3; 977/844; 422/186  
See application file for complete search history.

(56) References Cited

U.S. PATENT DOCUMENTS 4,427,884 A    1/1984    Anbar et al. ................. 250/283

| | | | |
|---|---|---|---|
| 6,183,714 B1* | 2/2001 | Smalley et al. | 423/447.3 |
| 6,422,450 B1* | 7/2002 | Zhou et al. | 219/121.85 |
| 7,029,751 B2* | 4/2006 | Fan et al. | 428/402 |
| 2004/0101685 A1* | 5/2004 | Fan et al. | 428/403 |

FOREIGN PATENT DOCUMENTS

| CN | 02152098 | 6/2004 |
|---|---|---|
| CN | 1234604 C | 1/2006 |

OTHER PUBLICATIONS

Zhang, et al., Heterogeneous growth of B-C-N nanotubes by laser ablation, Chemical Physics Letters 1997; 279: 264-269.*  
Liu, et al. Isotope Labelling of Carbon Nanotubes and Formation of 12C-13C Nanotube Junctions, J. Am. Chem. Soc. 2001; 123: 11502-11503.*  
Fan, et al., Monitoring the growth of carbon nanotubes by carbon isotope labelling, Nanotechnology 2003; 14:1118-1123.*

(Continued)

*Primary Examiner*—Stanley S. Silverman  
*Assistant Examiner*—Daniel C. McCracken  
(74) *Attorney, Agent, or Firm*—Clifford O. Chi

(57) ABSTRACT

A method for manufacturing isotope-doped carbon nanotubes (10) includes the steps of: (a) providing a carbon rod (209), the carbon rod including at least two kinds of carbon isotope segments (202, 203) arranged therealong according to need; (b) providing a laser beam source positioned opposite to the carbon rod; and (c) irradiating the carbon rod with a laser beam (214), wherein the carbon isotope segments of the carbon rod are consumed sequentially to form the isotope-doped carbon nanotubes. Growth mechanisms of the isotope-doped carbon nanotubes manufactured by this method can be readily studied.

19 Claims, 2 Drawing Sheets

OTHER PUBLICATIONS

Scott, et al., Growth mechanisms for single-wall carbon nanotubes in a laser-ablation process, Appl. Phys. A 2001; 72: 573-580.*

Arepalli, et al., Spectral measurements in produduction of single-wall carbon nanotubes by laser ablation, Chemical Physics Letters 1999; 302: 139-145.*

Xie, et al., "Large-Scale Synthesis of Aligned Carbon Nanotubes," *Science*, Dec. 6, 1995, vol. 274, No. 5293, pp. 1701-1703.

Sumio Iijima, Helical Microtubules of Graphitic Carbon. Nature. Nov. 7, 1991, 354,6348 Academic Research Library, GB.

T. W. Ebbesen & P. M. Ajayan, Large-scale synthesis of carbon nanotubes, Nature, Jul. 16, 1992, 358, 6383, Academic Research Library, GB.

W. Z. Li, S. S. Xie, L. X. Oian, B. H. Chang, B. S. Zou, W. Y. Zhou, R, A, Zhao, G. Wang. Large-scale Synthesis of Aligned Carbon Nanotubes, Science, Dec. 6, 1996. vol. 274, 1701-1703. US.

* cited by examiner

METHOD FOR MANUFACTURING ISOTOPE-DOPED CARBON NANOTUBES

CROSS-REFERENCE TO RELATED APPLICATIONS

This application is related to U.S. patent application Ser. No. 10/402,701, entitled "ISOTOPE-DOPED CARBON NANOTUBE AND METHOD AND APPARATUS FOR FORMING THE SAME" and filed on Mar. 28, 2003. The disclosure of the above identified application is incorporated herein by reference.

BACKGROUND OF THE INVENTION

The present invention relates to methods for manufacturing carbon nanotubes, and more particularly to methods for manufacturing isotope-doped carbon nanotubes.

Carbon nanotubes were discovered by S. Ijima (Nature, vol. 354, pp. 56-58, 1991) and synthesized by T. W. Ebbesen and P. M. Ajayan (Nature, vol. 358, pp. 220-222, 1992). Theoretical studies showed that carbon nanotubes exhibit either metallic or semiconductive behavior depending on the radii and helicity of the tubules. Carbon nanotubes have interesting and potentially useful electrical and mechanical properties, and offer potential for use in electronic devices. Carbon nanotubes also feature high aspect ratios (>1000) and atomically sharp tips, which make them ideal candidates for electron field emitters, white light sources, lithium secondary batteries, hydrogen storage cells, transistors and cathode ray tubes (CRTs).

Generally, there are three methods for manufacturing carbon nanotubes. The first method is the arc discharge method, which was first discovered and reported in an article by Sumio Iijima entitled "Helical Microtubules of Graphitic Carbon" (Nature, Vol. 354, Nov. 7, 1991, pp. 56-58). The second method is the laser ablation method, which was reported in an article by T. W. Ebbesen et al entitled "Large-scale Synthesis of Carbon Nanotubes" (Nature, Vol. 358, 1992, pp. 220). The third method is the chemical vapor deposition (CVD) method, which was reported in an article by W. Z. Li entitled "Large-scale Synthesis of Aligned Carbon Nanotubes" (Science, Vol. 274, 1996, pp. 1701).

Isotope labeling is a powerful tool in the study of nano-material growth mechanisms and nano-sized isotope junction synthesis. Methods of isotope labeling use reactants containing different isotopes of a special element (usually light elements such as carbon, boron, nitrogen and oxygen), which are fed in designated concentrations (pure or mixed) and sequences into a nano-material synthesis process to provide in situ isotope labeling of nano-materials.

However, the carbon nanotubes manufactured by the above-mentioned three methods are not isotope-doped, and the growth mechanisms of such carbon nanotubes cannot be readily studied.

What is needed, therefore, is a method for manufacturing isotope-doped carbon nanotubes.

SUMMARY

The present invention provides a method for manufacturing isotope-doped carbon nanotubes. A preferred embodiment of the method includes the steps of: (a) providing a carbon rod, the carbon rod comprising at least two kinds of carbon isotope segments; (b) providing a laser beam source positioned opposite to the carbon rod; and (c) irradiating the carbon rod with a laser beam, the carbon isotope segments of the carbon rod being consumed in sequence to form the isotope doped carbon nanotubes.

Compared with conventional carbon nanotube manufacturing methods, the preferred method of the present invention can manufacture the isotope-doped carbon nanotubes each including at least two kinds of carbon nanotube isotope segments. Therefore, growth patterns of the carbon isotopes can be recorded respectively by means of Raman Spectroscopy or by means of Secondary Ion Mass Spectroscopy. Thus, growth mechanisms of the carbon nanotubes can be readily studied corresponding to the growth patterns of the carbon isotopes.

Other advantages and novel features will become more apparent from the following detailed description of preferred embodiments when taken in conjunction with the accompanying drawings, in which:

DETAILED DESCRIPTION OF PREFERRED EMBODIMENTS

Reference will now be made to the drawings to describe preferred embodiments of the present invention in detail.

Figure 1:
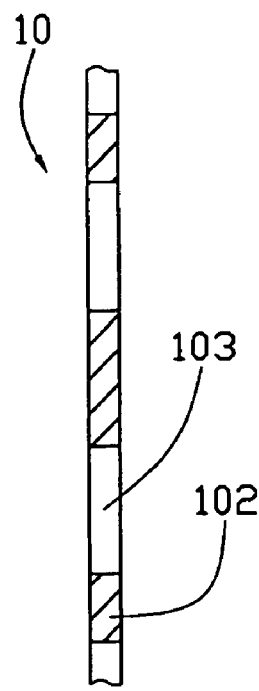
FIG. 1 is a schematic, side cross-sectional view of a carbon nanotube made in accordance with a first preferred embodiment of the present invention.

Referring to FIG. 1, an isotope-doped carbon nanotube 10 manufactured by a method in accordance with a first preferred embodiment of the present invention is shown. The carbon nanotube 10 comprises a plurality of first carbon nanotube isotope segments 102 and a plurality of second carbon nanotube isotope segments 103 alternately arranged along a longitudinal direction of the carbon nanotube 10. The first and second carbon nanotube isotope segments 102, 103 are selected from the group of consisting of a carbon-12 isotope segment, a carbon-13 isotope segment, and a carbon-14 isotope segment, according to need. In the first preferred embodiment, each first carbon nanotube isotope segment 102 is made of carbon-12 isotopes, and each second carbon nanotube isotope segment 103 is made of carbon-13 isotopes. In the first preferred embodiment, a length of the carbon nanotube 10 is in the range from 10 to 1000 micrometers, and a diameter of the carbon nanotube 10 is in the range from 0.5 to 50 nanometers.

Figure 2:
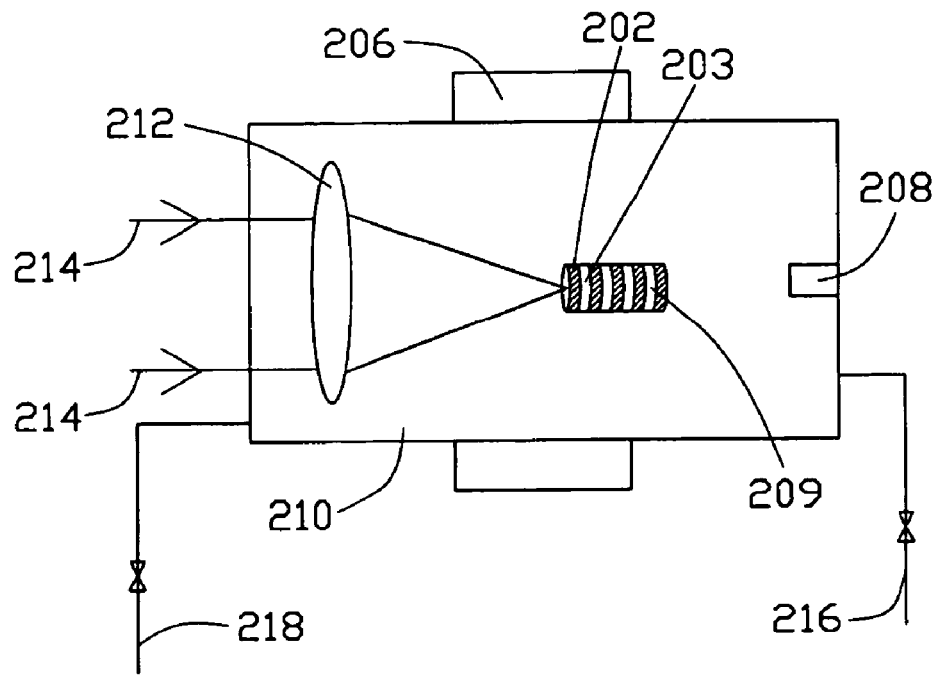
FIG. 2 is a schematic diagram of a first device for manufacturing a plurality of carbon nanotubes of FIG. 1.

Referring to FIG. 2, a method for manufacturing isotope doped carbon nanotubes in accordance with the first preferred embodiment of the present invention includes the steps of:

(a) providing a carbon rod 209, which includes two kinds of (i.e. first and second) carbon isotope segments 202 and 203 alternately arranged along a longitudinal direction thereof;

(b) providing a carbon nanotube accumulator 208;

(c) putting the carbon rod 209 and the accumulator 208 into a laser ablation reaction chamber 210, with the accumulator 208 being positioned behind the carbon rod 209 for collecting carbon nanotubes;

(d) creating a vacuum in the reaction chamber 210 via a gas exhaust conduit 216 thereof, and introducing a protection gas into the reaction chamber 210 via a gas supply conduit 218 thereof;

(e) heating a region in the vicinity of the carbon rod 209 up to 1000~1200° C. using a heater 206; and (f) focusing a pulsing laser beam 214 of a laser beam source (not shown) on the carbon rod 209 using a lens 212 located in front of the carbon rod 209, the pulsing laser beam 214 having a wavelength of 532 nm and a single pulsing energy of 250 mJ, a diameter of a spot of irradiation on the carbon rod 209 being 5 mm, whereby the carbon nanotube segments 202 and 203 are consumed in sequence to form isotope-doped carbon nanotubes on the accumulator 208.

In step (a), the carbon rod 209 can be manufactured by a powder delamination pressing method, which includes the following steps:

(a1) mixing a catalyst powder with carbon-12 powder and carbon-13 powder respectively to form two kinds of powder mixtures;

(a2) pressing the first powder mixture including carbon-12 isotopes under 3500 pascals to form one first carbon isotope segment 202;

(a3) pressing the second powder mixture including carbon-13 isotopes under 3500 pascals on the first carbon isotope segment 202 to form one second carbon isotope segment 203; and (a4) repeating steps (a2) and (a3) appropriately in turn to form the carbon rod 209.

In step (a1), the catalyst powder can be a nickel powder, a yttrium oxide powder, or a mixture thereof. In the first preferred embodiment, a diameter of the carbon rod 209 is about 10 millimeters.

Alternatively, the carbon rod 209 can be manufactured by a paste delamination sintering method, which includes the following steps:

(a1') mixing a catalyst powder and a solvent with a carbon-12 powder and a carbon-13 powder respectively to form two kinds of paste mixtures;

(a2') coating/printing and drying a layer of the first mixture paste including carbon-12 isotopes to form one first carbon isotope segment 202;

(a3') coating/printing and drying a layer of the second mixture paste including carbon-13 isotopes on the first carbon isotope segment 202 to form one second carbon isotope segment 203; and (a4') repeating steps (a2') and (a3') appropriately in turn to form the carbon rod 209.

In step (a1'), the catalyst powder can be a nickel powder, a yttrium oxide powder, or a mixture thereof. In the first preferred embodiment, a diameter of the carbon rod 209 is about 10 millimeters.

In step (d), the protection gas can be helium gas, argon gas, nitrogen gas, or hydrogen gas. In the first preferred embodiment, the protection gas is argon gas, and a pressure of the argon gas is in the range from 50~760 torr.

Figure 3:
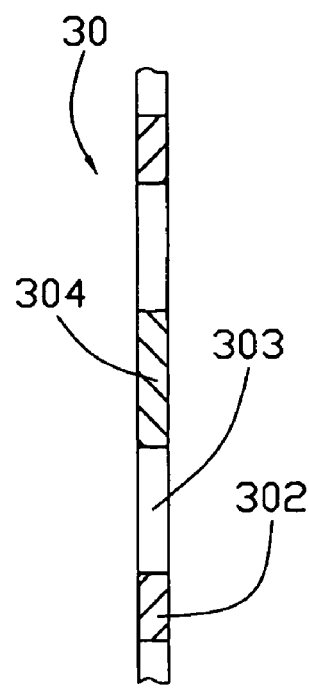
FIG. 3 is a schematic, side cross-sectional view of a carbon nanotube made in accordance with a second preferred embodiment of the present invention.

Referring to FIG. 3, an isotope-doped carbon nanotube 30 manufactured by a method in accordance with a second preferred embodiment of the present invention is shown. The carbon nanotube 30 comprises a plurality of first carbon nanotube isotope segments 302, a plurality of second carbon nanotube isotope segments 303, and a plurality of third carbon nanotube isotope segments 304 all arranged along a longitudinal direction of the carbon nanotubes 30 according to need. In the second preferred embodiment, each first carbon nanotube isotope segment 302 is made of carbon-12 isotopes, each second carbon nanotube isotope segment 303 is made of carbon-13 isotopes, and each third carbon nanotube isotope segment 304 is made of carbon-14 isotopes. In the second preferred embodiment, a length of the carbon nanotube 30 is in the range from 10 to 1000 micrometers, and a diameter of the carbon nanotube 30 is in the range from 0.5 to 50 nanometers.

Figure 4:
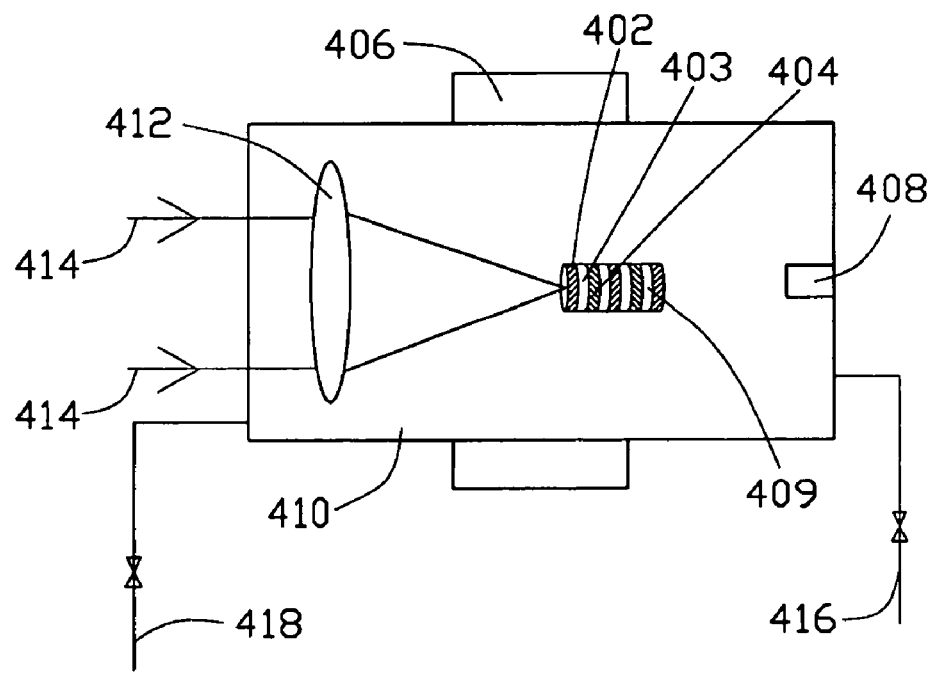
FIG. 4 is a schematic diagram of a second device for manufacturing a plurality of carbon nanotubes of FIG. 3.

Referring to FIG. 4, a method for manufacturing isotope doped carbon nanotubes in accordance with the second preferred embodiment of the present invention includes the steps of:

(g) providing a carbon rod 409, which includes three kinds of (i.e., first, second and third) carbon isotope segments 402, 403 and 404 alternately or non-alternately arranged along a longitudinal direction of the carbon rod 409;

(h) providing a carbon nanotube accumulator 408;

(i) putting the carbon rod 409 and the accumulator 408 into a laser ablation reaction chamber 410, with the accumulator 408 being positioned behind the carbon rod 409 for collecting carbon nanotubes;

(j) creating a vacuum in the reaction chamber 410 via a gas exhaust conduit 416 thereof, and introducing a protection gas into the reaction chamber 410 via a gas supply conduit 418 thereof;

(k) heating a region in the vicinity of the carbon rod 409 up to 1000~1200° C. using a heater 406; and (l) focusing a pulsing laser beam 414 of a laser beam source (not shown) on the carbon rod 409 using a lens 412 located in front of the carbon rod 409, the pulsing laser beam 414 having a wavelength of 532 nm and a single pulsing energy of 250 mJ, a diameter of a spot of irradiation on the carbon rod 409 being 5 mm, whereby the carbon nanotube segments 402, 403 and 404 are consumed in sequence to form isotope-doped carbon nanotubes on the accumulator 408.

In step (g), the carbon rod 409 can be manufactured by a powder delamination pressing method, which includes the following steps:

(g1) mixing a catalyst powder with a carbon-12 powder, a carbon-13 powder and a carbon-14 powder respectively to form three kinds of powder mixtures;

(g2) pressing the first powder mixture including carbon-12 isotopes under 3500 pascals to form one first carbon isotope segment 402;

(g3) pressing the second powder mixture including carbon-13 isotopes under 3500 pascals on the first carbon isotope segment 402 to form one second carbon isotope segment 403;

(g4) pressing the third powder mixture including carbon-14 isotopes under 3500 pascals on the second carbon isotope segment 403 to form one third carbon isotope segment 404; and (g5) repeating steps (g2), (g3) and (g4) appropriately to form the carbon rod 409.

In step (g1), the catalyst powder can be a nickel powder, a yttrium oxide powder, or a mixture thereof. In the second preferred embodiment, a diameter of the carbon rod 409 is about 10 millimeters.

Alternatively, the carbon rod 409 can be manufactured by a paste delamination sintering method, which includes the following steps:

(g1') mixing a catalyst powder and a solvent with a carbon-12 powder, a carbon-13 powder and a carbon-14 powder respectively to form three kinds of paste mixtures;

(g2') coating/printing and drying a layer of the first paste mixture including carbon-12 isotopes to form one first carbon isotope segment 402;

(g3') coating/printing and drying a layer of the second paste mixture including carbon-13 isotopes on the first carbon isotope segment 402 to form one second carbon isotope segment 403;

(g4') coating/printing and drying a layer of the third paste mixture including carbon-14 isotopes on the second carbon isotope segment 403 to form one third carbon isotope segment 404; and (g5') repeating steps (g2'), (g3') and (g4') appropriately to form the carbon rod 409.

In step (g1'), the catalyst powder can be a nickel powder, a yttrium oxide powder, or a mixture thereof. In the second preferred embodiment, a diameter of the carbon rod 409 is about 10 millimeters.

In step (j), the protection gas can be helium gas, argon gas, nitrogen gas, or hydrogen gas. In the first preferred embodiment, the protection gas is argon gas, and a pressure of the argon gas is in the range from 50~760 torr.

Compared with conventional carbon nanotube manufacturing methods, the preferred method of the present invention can manufacture the isotope-doped carbon nanotubes each including at least two kinds of carbon nanotube isotope segments. Therefore, growth patterns of the carbon isotopes can be recorded respectively by means of Raman Spectroscopy or by means of Secondary Ion Mass Spectroscopy. Thus, growth mechanisms of the carbon nanotubes can be readily studied corresponding to the growth patterns of the carbon isotopes.

It is to be understood that the above-described embodiments are intended to illustrate rather than limit the invention. Variations may be made to the embodiments without departing from the spirit of the invention as claimed. The above-described embodiments are intended to illustrate the scope of the invention and not restrict the scope of the invention.

We claim:

1. A method for manufacturing isotope doped carbon nanotubes, comprising the steps of:
   (a) providing a carbon rod, the carbon rod comprising at least two kinds of carbon isotope segments arranged along a longitudinal direction of the carbon rod;
   (b) providing a laser beam source positioned opposite to the carbon rod;
   (c) positioning a lens between the laser beam source and the carbon rod, the lens modulating a laser beam produced by the laser beam source before the laser beam travels to the carbon rod; and
   (d) irradiating the carbon rod with the laser beam produced by the laser beam source, the carbon isotope segments of the carbon rod being consumed in sequence to form the isotope doped carbon nanotubes.

2. The method as claimed in claim 1, wherein a working temperature in forming the isotope-doped carbon nanotubes is in the range from 1000 to 1200° C.

3. The method as claimed in claim 1, wherein the carbon isotope segments are selected from the group consisting of a carbon-12 isotope segment, a carbon-13 isotope segment, and a carbon-14 isotope segment.

4. The method as claimed in claim 3, wherein the carbon isotope segments further comprise one or more catalyst powders.

5. The method as claimed in claim 4, wherein the catalyst powders are selected from the group consisting of a nickel powder, a yttrium oxide powder, and any mixture thereof.

6. The method as claimed in claim 1, wherein the carbon rod is manufactured by a powder delamination pressing method or a paste delamination sintering method.

7. The method as claimed in claim 6, wherein the powder delamination pressing method comprises the steps of:
   (a1) mixing one or more catalyst powders with two or more kinds of carbon isotopes respectively to form at least two kinds of powder mixtures;
   (a2) pressing a first powder mixture comprising a first carbon isotope to form a first carton isotope segment;
   (a3) pressing a second powder mixture comprising a second carbon isotope to form a second carbon isotope segment on the first carbon isotope segment; and
   (a4) repeating steps (a2) and (a3) appropriately in turn to form the carbon rod.

8. The method as claimed in claim 6, wherein the paste delamination sintering method comprises the steps of:
   (a1') mixing one or more catalyst powders and a solvent with two or more carbon isotopes respectively to form at least two kinds of paste mixtures;
   (a2') coating and/or printing and then drying a layer of a first paste mixture comprising a first carbon isotope to form a first carbon isotope segment
   (a3') coating and/or printing and then drying a layer of a second paste mixture comprising a second carbon isotope to form a second carbon isotope segment on the first carbon isotope segment; and
   (a4') repeating steps (a2') and (a3') appropriately in turn to form the carbon rod.

9. The method as claimed in claim 1, wherein the laser beam has a wavelength of 532 nm and a single pulsing energy of 250 mJ.

10. The method as claimed in claim 1, wherein a protection gas is provided in step (c).

11. The method as claimed in claim 10, wherein the protection gas is helium gas, argon gas, nitrogen gas, or hydrogen gas.

12. A method for manufacturing isotope doped nanotubes of an element, comprising the steps of:
   preparing a rod with at least two kinds of isotope segments of said element arranged in a desired sequence along a longitudinal direction of said rod;
   equipping a laser beam source beside an end of said rod so as to be capable of focusing laser beams thereof on said end of said rod; and
   positioning a lens between said laser beam source and said end of said rod for modulating said laser beams produced by said laser beam source before said laser beams travels to said rod;
   providing an accumulator next to said rod and capable of collecting separate isotopes of said element from said rod so as to for said nanotubes thereon; and
   irradiating said end of said rod with said laser beams to separately introduce said at least two kind of isotopes of said element from said rod onto said accumulator respectively and segment by segment.

13. The method as claimed in claim 12, wherein each of said isotopes of said element are selected from the group consisting of carbon-12 isotope, carbon-13 isotope and carbon-14 isotope.

14. The method as claimed in claim 12, wherein said rod is formed by three kinds of carbon isotope segments in said preparing step.

15. An apparatus for manufacturing isotope doped nanotubes of an element, comprising:
   a reaction chamber;
   a rod placed in said reaction chamber and having isotope segments of said element arranged in a desired sequence along a longitudinal direction of said rod;
   a laser beam source arranged in said chamber beside an end of said rod so as to be capable of focusing laser beams thereof on said end of said rod;
   a lens arranged in said reaction chamber between said laser beam source and said end of said rod; and an accumulator arranged in said chamber next to said rod and capable of collecting isotopes of said element separately irradiated from said segments of said rod by said laser beams of said laser beam source so as to form said nanotubes thereon.

16. The apparatus as claimed in claim 15, wherein said rod is formed by three kinds of carbon isotope segments.

17. The apparatus as claimed in claim 15, further comprising a heater arranged beside said reaction chamber and capable of heating said chamber.

18. The apparatus as claimed in claim 15, wherein said reaction chamber comprises a gas supply conduit and a gas exhaust conduit on opposite sides of said reaction chamber, said gas supply conduit is positioned between an edge of said lens and a sidewall of said reaction chamber.

19. The apparatus as claimed in claim 18, wherein said gas exhaust conduit is positioned above said gas supply conduit and under said accumulator.

* * * * *